United States Patent
Shock et al.

(10) Patent No.: US 9,643,869 B2
(45) Date of Patent: May 9, 2017

(54) SYSTEM FOR PRODUCING MOLTEN GLASSES FROM GLASS BATCHES USING TURBULENT SUBMERGED COMBUSTION MELTING

(75) Inventors: Jeffrey M. Shock, Castle Rock, CO (US); Jonathan McCann, Castle Rock, CO (US)

(73) Assignee: Johns Manville, Denver, CO (US)

( * ) Notice: Subject to any disclaimer, the term of this patent is extended or adjusted under 35 U.S.C. 154(b) by 408 days.

(21) Appl. No.: 13/540,704

(22) Filed: Jul. 3, 2012

(65) Prior Publication Data
US 2014/0007622 A1 Jan. 9, 2014

(51) Int. Cl.
*C03B 5/04* (2006.01)
*C03B 5/183* (2006.01)
(Continued)

(52) U.S. Cl.
CPC .................. *C03B 5/04* (2013.01); *C03B 1/02* (2013.01); *C03B 3/005* (2013.01); *C03B 3/023* (2013.01); *C03B 5/183* (2013.01); *C03B 5/20* (2013.01); *C03B 5/2356* (2013.01); *C03B 5/26* (2013.01); *C03B 5/43* (2013.01); *C03B 5/44* (2013.01); *C03B 2211/22* (2013.01); *C03B 2211/70* (2013.01)

(58) Field of Classification Search
CPC ......... C03B 5/2356; C03B 1/02; C03B 19/08; C03B 2211/23; C03B 37/02; C03B 37/06; C03B 37/07; C03B 3/023; C03B 5/04; C03B 5/20; C03B 5/202; C03B 5/2353; C03B 5/24; C03B 5/44

USPC ............. 65/29.13, 335, 347, 135.9, 145–146
See application file for complete search history.

(56) References Cited

U.S. PATENT DOCUMENTS

| 2,174,533 | A | 10/1939 | See et al. |
| 2,432,942 | A | 12/1947 | See et al. |

(Continued)

FOREIGN PATENT DOCUMENTS

| EP | 0086859 | * | 2/1982 | ............... C03B 5/18 |

OTHER PUBLICATIONS

"Glass Technologies—The Legacy of a Successful Public-Private Partnership", 2007, U.S. Department of Energy, pp. 1-32.
(Continued)

*Primary Examiner* — Jodi C Franklin
(74) *Attorney, Agent, or Firm* — Robert D. Touslee

(57) ABSTRACT

Processes and systems for producing molten glass using submerged combustion melters, including densifying an initial composition comprising vitrifiable particulate solids and interstitial gas to form a densified composition comprising the solids by removing a portion of the interstitial gas from the composition. The initial composition is passed from an initial environment having a first pressure through a second environment having a second pressure higher than the first pressure to form a composition being densified. Any fugitive particulate solids escaping from the composition being densified are captured and recombined with the composition being densified to form the densified composition. The densified composition is fed into a feed inlet of a turbulent melting zone of a melter vessel and converted into turbulent molten material using at least one submerged combustion burner in the turbulent melting zone.

12 Claims, 10 Drawing Sheets

(51) Int. Cl.
*C03B 1/02* (2006.01)
*C03B 3/00* (2006.01)
*C03B 5/20* (2006.01)
*C03B 5/235* (2006.01)
*C03B 5/26* (2006.01)
*C03B 5/43* (2006.01)
*C03B 3/02* (2006.01)
*C03B 5/44* (2006.01)

(56) References Cited

U.S. PATENT DOCUMENTS

| | | | |
|---|---|---|---|
| 3,170,781 | A | 2/1965 | Keefer |
| 3,237,322 | A | 3/1966 | Plumat et al. |
| 3,260,587 | A | 7/1966 | Dolf et al. |
| 3,325,298 | A | 6/1967 | Brown |
| 3,563,683 | A | 2/1971 | Hess |
| 3,592,623 | A | 7/1971 | Shepherd |
| 3,606,825 | A | 9/1971 | Johnson |
| 3,617,234 | A | 11/1971 | Hawkins et al. |
| 3,627,504 | A | 12/1971 | Johnson et al. |
| 3,738,792 | A | 6/1973 | Feng |
| 3,746,527 | A | 7/1973 | Knavish et al. |
| 3,764,287 | A | 10/1973 | Brocious |
| 3,771,988 | A | 11/1973 | Starr |
| 3,788,832 | A * | 1/1974 | Nesbitt ............ C03B 1/02 65/134.6 |
| 3,885,945 | A | 5/1975 | Rees et al. |
| 3,951,635 | A | 4/1976 | Rough |
| 3,976,464 | A | 8/1976 | Wardlaw |
| 4,004,903 | A | 1/1977 | Daman et al. |
| 4,101,304 | A * | 7/1978 | Marchand ............ C03B 5/04 65/135.1 |
| 4,110,098 | A | 8/1978 | Mattmuller |
| 4,185,982 | A | 1/1980 | Schwenninger |
| 4,203,761 | A | 5/1980 | Rose |
| 4,226,564 | A | 10/1980 | Takahashi et al. |
| 4,282,023 | A | 8/1981 | Hammel et al. |
| 4,303,435 | A | 12/1981 | Sleighter |
| 4,323,718 | A | 4/1982 | Buhring et al. |
| 4,349,376 | A | 9/1982 | Dunn et al. |
| 4,406,683 | A | 9/1983 | Demarest |
| 4,455,762 | A * | 6/1984 | Saeman ............ 34/170 |
| 4,539,034 | A | 9/1985 | Hanneken |
| 4,816,056 | A | 3/1989 | Tsai et al. |
| 4,994,099 | A * | 2/1991 | Boettner ............ C03B 5/20 65/134.9 |
| 5,052,874 | A * | 10/1991 | Johanson ............ 414/326 |
| 5,057,140 | A * | 10/1991 | Nixon ............ C03B 3/00 65/136.1 |
| 5,169,424 | A | 12/1992 | Grinnen et al. |
| 5,405,082 | A | 4/1995 | Brown et al. |
| 5,613,994 | A | 3/1997 | Muniz et al. |
| 5,713,668 | A | 2/1998 | Lunghofer et al. |
| 5,718,741 | A | 2/1998 | Hull et al. |
| 5,814,121 | A | 9/1998 | Travis |
| 5,887,978 | A | 3/1999 | Lunghofer et al. |
| 5,944,864 | A | 8/1999 | Hull et al. |
| 6,036,480 | A | 3/2000 | Hughes et al. |
| 6,044,667 | A * | 4/2000 | Chenoweth ............ C03B 5/0275 373/30 |
| 6,156,285 | A | 12/2000 | Adams et al. |
| 6,244,197 | B1 | 6/2001 | Coble |
| 6,314,760 | B1 | 11/2001 | Chenoweth |
| 6,344,747 | B1 | 2/2002 | Lunghofer et al. |
| 6,460,376 | B1 | 10/2002 | Jeanvoine et al. |
| 6,715,319 | B2 | 4/2004 | Barrow et al. |
| 6,739,152 | B2 | 5/2004 | Jeanvoine et al. |
| 6,857,999 | B2 | 2/2005 | Jeanvoine |
| 6,883,349 | B1 | 4/2005 | Jeanvoine |
| 7,273,583 | B2 | 9/2007 | Rue et al. |
| 7,383,698 | B2 | 6/2008 | Ichinose et al. |
| 7,392,668 | B2 | 7/2008 | Adams et al. |
| 7,428,827 | B2 | 9/2008 | Maugendre et al. |
| 7,448,231 | B2 | 11/2008 | Jeanvoine et al. |
| 7,509,819 | B2 | 3/2009 | Baker et al. |
| 7,565,819 | B2 | 7/2009 | Jeanvoine et al. |
| 7,622,677 | B2 | 11/2009 | Barberree et al. |
| 8,033,254 | B2 | 10/2011 | Hannum et al. |
| 2002/0162358 | A1 * | 11/2002 | Jeanvoine ............ C03B 5/225 65/134.5 |
| 2004/0168474 | A1 | 9/2004 | Jeanvoine et al. |
| 2004/0224833 | A1 | 11/2004 | Jeanvoine et al. |
| 2006/0000239 | A1 | 1/2006 | Jeanvoine et al. |
| 2007/0122332 | A1 | 5/2007 | Jacques et al. |
| 2007/0212546 | A1 | 9/2007 | Jeanvoine et al. |
| 2007/0220922 | A1 | 9/2007 | Bauer et al. |
| 2008/0256981 | A1 | 10/2008 | Jacques et al. |
| 2008/0276652 | A1 * | 11/2008 | Bauer et al. ............ 65/454 |
| 2009/0042709 | A1 | 2/2009 | Jeanvoine et al. |
| 2009/0235695 | A1 * | 9/2009 | Pierrot et al. ............ 65/356 |
| 2011/0308280 | A1 * | 12/2011 | Huber ............ 65/126 |
| 2012/0077135 | A1 | 3/2012 | Charbonneau |
| 2013/0086952 | A1 * | 4/2013 | Charbonneau et al. ......... 65/377 |

OTHER PUBLICATIONS

Rue, "Energy-Efficient Glass Melting—The Next Generation Melter", Gas Technology Institute, Project No. 20621 Final Report, 2008.
Sims, Richard, "Batch charging technologies—a review," May 2011, www.glassonweb.com, Nikolaus Sorg Gmbh & Co KG.
"Glass Melting", Baitelle PNNL MST Handbook, U.S. Department of Energy, Pacific Northwest Laboratory, retrieved from the Internet Apr. 20, 2012.
"Roll Compaction", brochure from The Fitzpatrick Company, Elmhurst, Illinois, retrieved from the Internet Apr. 20, 2012.
U.S. Appl. No. 12/817,754, filed Jun. 17, 2010, Huber.
U.S. Appl. No. 12/886,970, filed Sep. 23, 2010, Charbonneau.
U.S. Appl. No. 13/268,028, filed Oct. 7, 2011, Charbonneau.
U.S. Appl. No. 13/268,065, filed Oct. 7, 2011, Charbonneau et al.
U.S. Appl. No. 13/268,130, filed Oct. 7, 2011, Charbonneau et al.
U.S. Appl. No. 13/458,211, filed Apr. 27, 2012, Mobley et al.

* cited by examiner

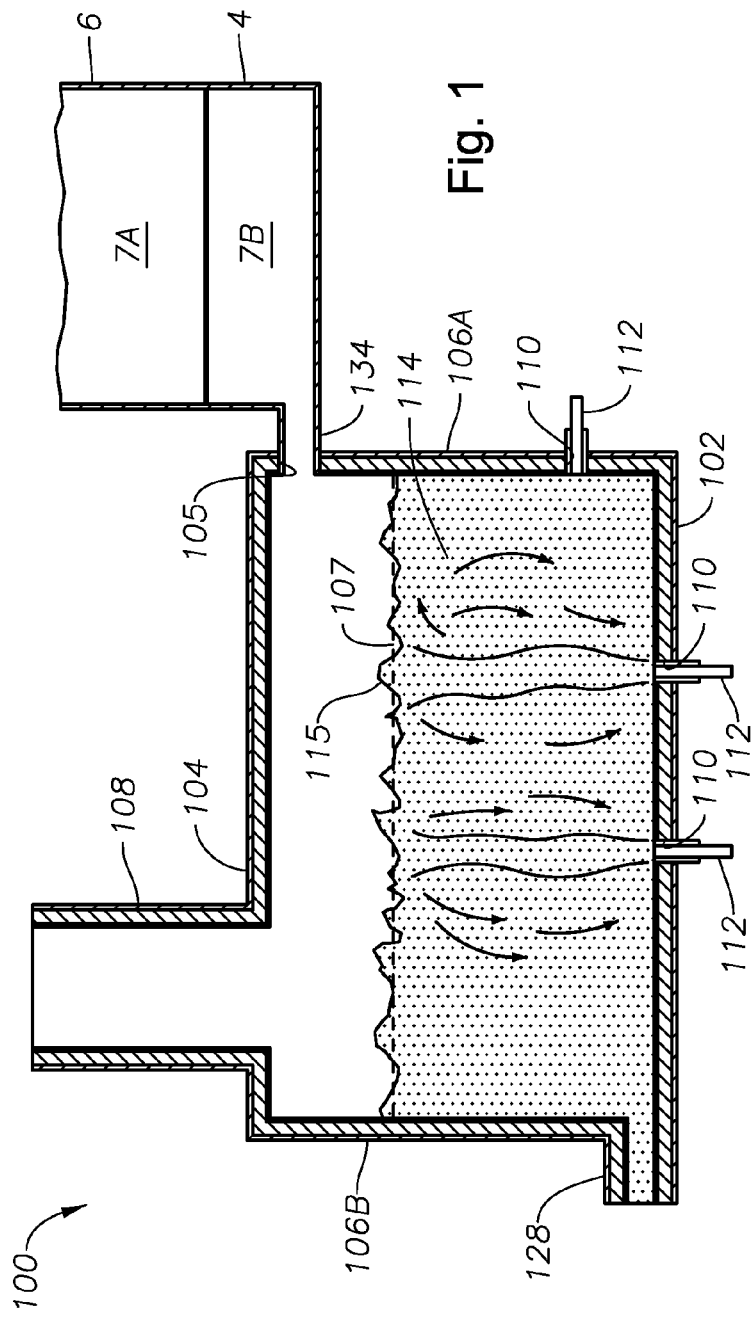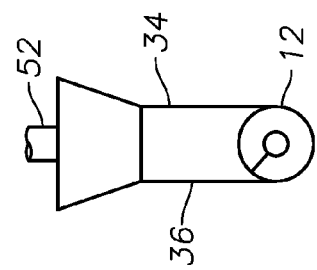

SYSTEM FOR PRODUCING MOLTEN GLASSES FROM GLASS BATCHES USING TURBULENT SUBMERGED COMBUSTION MELTING

BACKGROUND INFORMATION

Technical Field

The present disclosure relates generally to the field of combustion furnaces and methods of use, and more specifically to processes for producing molten glasses from glass batches using turbulent submerged combustion melting, and systems for carrying out such processes.

Background Art

In submerged combustion melting of glass and similar materials, combustion gases emitted from sidewall-mounted and/or floor-mounted burners are injected beneath the surface of a molten or partially molten mass of material being melted in a melter vessel and rise upward through the molten or partially molten mass. The molten or partially molten mass of material is a complex mixture of molten feed material (feed material is commonly referred to as "batch" in the glass industry), unmelted batch, and gases from the burners and evolved gases from the reaction of and/or decomposition of batch materials. Recycled glass or "cullet", as well as various waste materials of varying glass content (such as fiberglass batting or even loose fibers) may also be present. The materials are heated at a high efficiency via the intimate contact with the combustion gases. Using submerged combustion burners produces violent turbulence of the molten material or partially molten material. Vibration of the burners and/or the melter vessel walls themselves, due to sloshing of molten material, pulsing of combustion burners, popping of large bubbles above or aside of submerged burners, ejection of molten material from the melt against the walls and ceiling of melter vessel, and the like, are possible.

Feeding batch to a turbulent submerged combustion melter often presents challenges. Fast melting is of course desired, and attempts have been made to achieve that goal in non-submerged combustion melters, such as changing the shape of the batch itself, or by compressing the batch blanket formed inside the melter, but these techniques affect the throughput of the melter (see for example the discussion in U.S. Pat. No. 4,004,903). Different mechanical devices, such as vacuum and rotary devices, have been proposed to remove air from batch for the purposes of increasing the melting rate of batch in non-submerged, non-turbulent combustion melters (see for example U.S. Pat. No. 3,325,298). None of the previous solutions have recognized, or had to deal with a particular problem associated with submerged combustion, that is the entrainment of a portion of the batch out of the melter before it even has a chance to melt. This can lead to off specification molten glass, and/or molten glass of inconsistent chemistry leaving the submerged combustion melter. Given that loss of batch out of a submerged combustion melter stack is unacceptable, reduction of batch loss would be welcome.

In contrast to the present disclosure, Rue, "Energy-Efficient Glass Melting—The Next Generation Melter", Gas Technology Institute, Project No. 20621 Final Report (2008) advised that, in submerged combustion melters, batch handling systems can be simple and inexpensive because the melter is tolerant of a wide range of batch and cullet size and does not require perfect feed blending. The report also maintains that the size, physical nature, and homogeneity of the batch do not require strict control. While these statements may be true in the context of comparing submerged combustion to non-submerged combustion melting of glass batch, the inventors herein have discovered that, without particular attention to the physical condition of glass batch, loss of batch may be a significant problem in submerged combustion processes and systems.

It would be a significant advance in the glass melting art to develop processes of operating submerged combustion melters, and systems to carry out the processes in producing molten glass wherein the problem of batch loss is reduced or eliminated.

SUMMARY

In accordance with the present disclosure, processes and systems for carrying out the processes are described that reduce or eliminate batch loss in submerged combustion melters. The processes and systems described herein are relevant to the full range of glass precursor materials that may be melted with submerged combustion technology, but are particularly well-suited for "glass batch", as that term is defined herein.

A first aspect of this disclosure is a process comprising:
a) densifying an initial composition comprising vitrifiable particulate solids and interstitial gas (for example, glass batch) to form a densified composition comprising the solids by removing a portion of the interstitial gas from the composition by
  i) passing the initial composition from an initial environment having a first pressure through a second environment having a second pressure higher than the first pressure to form a composition being densified, and
  ii) capturing any fugitive particulate solids escaping from the composition being densified and recombining the fugitive particulate solids with the composition being densified to form the densified composition;
b) feeding the densified composition into a feed inlet of a turbulent melting zone of a melter vessel; and
c) converting the densified composition into turbulent molten material using at least one submerged combustion burner in the turbulent melting zone.

A second aspect of this disclosure is a process comprising:
a) densifying an initial composition comprising vitrifiable particulate solids and interstitial gas to form a densified composition comprising the solids by removing a portion of the interstitial gas from the composition, the densifying comprising:
  i) removing air from the initial composition stored in a source chamber, the removing comprising:
  ii) subjecting the initial composition to a succession of operations in a plurality of sections of a screw feeder having a shaft and a thread, including
  iii) drawing the initial composition from the source chamber into a feeding section of the screw feeder extending into the source chamber;
  iv) drawing the initial composition from the feeding section into a feed seal section adjacent the feeding section;
  v) conveying the initial composition through a conveying section adjacent the feed seal section;
  vi) passing the initial composition through a recirculation section adjacent the conveying section;
  vii) passing the initial composition through a high pressure section adjacent the conveying section to form a composition being densified and ultimately the densified composition;

viii) confining particulate solids blown out of the high pressure section of the screw feeder as the composition being densified is compressed thereby in a recirculation chamber through which the screw feeder extends, the recirculation chamber further enclosing the conveying section and the recirculation section;

b) feeding the densified composition into a feed inlet of a turbulent melting zone of a melter vessel;

c) converting the densified composition into turbulent molten material using at least one burner directing combustion products into the turbulent melting zone under a level of the turbulent molten material in the turbulent melting zone, one or more of the burners imparting turbulence to the turbulent molten material in the turbulent melting zone;

d) passing the turbulent molten material through a melter exit structure to form a less turbulent or non-turbulent molten material; and e) discharging the less turbulent or non-turbulent molten material from the melter vessel.

A third aspect of this disclosure is a system comprising:

a) a melter vessel comprising a floor, a ceiling, and a wall connecting the floor and ceiling at a perimeter of the floor and ceiling, the melter vessel comprising a feed opening in the wall or ceiling and an exit end comprising a melter exit structure for discharging molten material formed in a turbulent melting zone, and one or more burners, at least one of which is positioned to direct combustion products into the turbulent melting zone under a level of turbulent molten material in the turbulent melting zone; and b) a feed processing unit fluidly and mechanically coupled to the melter feed opening, the feed processing unit configured to treat an initial composition comprising vitrifiable particulate solids and interstitial gas (for example, glass batch) to form a densified composition comprising the solids by removing a portion of the interstitial gas from the initial composition by i) passing the initial composition from an initial environment having a first pressure through a second environment having a second pressure higher than the first pressure to form a composition being densified, and ii) capturing any fugitive particulate solids escaping from the composition being densified and recombining the fugitive particulate solids with the composition being densified to form the densified composition;

the feed processing unit comprising a recirculation section, the processing unit selected from the group consisting of a compacting screw feeder, one or more pairs of compacting rolls, one or more briquetting rolls, and one or more roll presses, the feed processing unit configured to feed the densified composition into the feed opening of the melter vessel in the turbulent melting zone.

Processes and systems of this disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIGS. 1, 2, 3, and 4 illustrate schematic side elevation views, partially in cross-section, of various system embodiments in accordance with the present disclosure;

FIG. 2A is a schematic cross sectional view of the compacting screw feeder of FIG. 2 taken in the direction 2A-2A indicated in FIG. 2;

Figure 2:
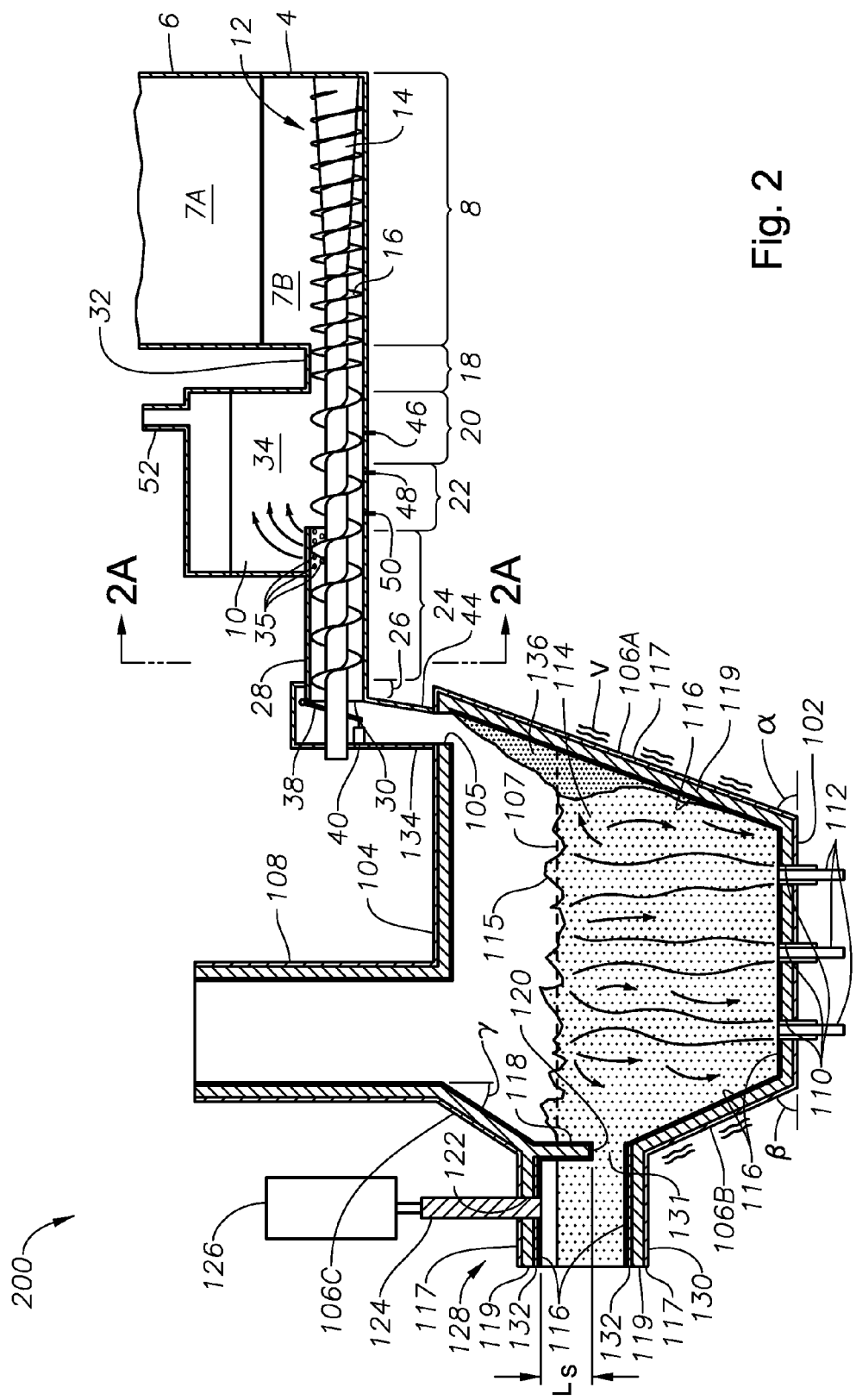

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of various melter apparatus and process embodiments in accordance with the present disclosure. However, it will be understood by those skilled in the art that the melter apparatus and processes of using same may be practiced without these details and that numerous variations or modifications from the described embodiments may be possible which are nevertheless considered within the appended claims. All U.S. published patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling.

The term "densifying" as used herein means increasing density of a given composition while increasing its compaction so that fines of solids do not, or are less likely to, escape through the melter exhaust system after being fed into a submerged combustion melter. An initial composition, which may be a glass batch composition, comprising at least one solid and at least one gas is densified by reducing the volume of the composition to eliminate or expel some of the gas. In some embodiments, as explained herein, an initial composition comprising an initial gas may be densified and another gas injected into the composition being densified to partially or wholly replace the initial gas. In any case, a "densified composition" has a density greater than the initial composition and is compacted in a fashion so that it is less likely to lose significant mass due to fines escaping the melter exhaust than a non-densified composition. Although inevitably a small amount of fines will escape the turbulent melting zone, the goal is to reduce this amount to zero.

"Submerged" as used herein means that combustion gases emanate from burners under the level of the molten glass; the burners may be floor-mounted, wall-mounted, or in melter embodiments comprising more than one submerged combustion burner, any combination thereof (for example, two floor mounted burners and one wall mounted burner). As used herein the term "combustion gases" means substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels.

The phrase "turbulent melting zone" means that zone in a submerged combustion melter wherein there is very turbulent, sometimes extraordinarily turbulent conditions inside the submerge combustion melter. The phrase "turbulent molten material" means molten material that is in a condition of high turbulence, with many bubbles of combustion product gases and gases evolved from the batch materials becoming entrained in the molten material and some of the bubbles bursting as they reach the surface of the molten mass. This high degree of turbulence can increase the mechanical load on the melter vessel walls significantly, especially in embodiments where some or all of the walls are fluid-cooled, as fluid-cooled wall structures may be made thinner than non-cooled walls since the frozen or highly viscous glass layer formed thereon protects the walls better than non-cooled walls. Therefore, while there may be savings in cost of materials for submerged combustion melter vessels with thinner, fluid-cooled walls, and fuel savings due to better heat transfer to the melt, there may be adverse physical impacts on the melter structure due to the very high turbulence imparted during submerged combustion.

The phrase "glass batch" as used herein refers to the initial raw material, or glass source material, and may include any material suitable for forming molten glass such as, for example, limestone, glass, sand, soda ash, feldspar and mixtures thereof. It is important to recognize the difference between the glass batch composition and the glass forming ingredients or components of the glass batch. See for example "Glass Melting", Battelle PNNL MST Handbook, U.S. Department of Energy, Pacific Northwest Laboratory, retrieved 2012 Apr. 20. In one embodiment, a glass composition for producing glass fibers may be "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's published U.S. applications 20070220922 and 20080276652. The initial raw material to provide these glass compositions can be calculated in known manner from the desired concentrations of glass components, molar masses of glass components, chemical formulas of batch components, and the molar masses of the batch components. Typical E-glass batches include those reproduced in Table 1, borrowed from the 20070220922 application. Notice that during glass melting, carbon dioxide (from lime) and water (borax) evaporate.

TABLE 1

Typical E-glass batches

| Raw material | A Limestone (Baseline) | B Quick-lime | C Ca Silicate | D Volcanic Glass | E Ca Silicate & Volcanic Glass | F Quartz-free #1 | G Quartz-free #2 | H Limestone/ Slag | I Ca-Silicate/ Slag | J Quartz-free #3 | K Quartz and Clay free | L Ca-Silicate/ Feldspar |
|---|---|---|---|---|---|---|---|---|---|---|---|---|
| Quartz (flint) | 31.3% | 35.9% | 15.2% | 22.6% | 8.5% | 0% | 0% | 22.3% | 5.7% | 0% | 0% | 19.9% |
| Kaolin Clay | 28.1% | 32.3% | 32.0% | 23.0% | 28.2% | 26.4% | 0% | 22.7% | 26.0% | 26.0% | 0% | 0% |
| BD Lime | 3.4% | 4.3% | 3.9% | 3.3% | 3.8% | 3.7% | 4.3% | 2.8% | 3.1% | 3.1% | 4.3% | 4.4% |
| Borax | 4.7% | 5.2% | 5.2% | 0% | 1.5% | 0% | 0% | 0% | 0% | 0% | 1.1% | 1.1% |
| Boric Acid | 3.2% | 3.9% | 3.6% | 7.3% | 6.9% | 8.2% | 8.6% | 7.3% | 8.2% | 8.2% | 7.7% | 7.8% |
| Salt Cake | 0.2% | 0.2% | 0.2% | 0.2% | 0.2% | 0.2% | 0.2% | 0.2% | 0.2% | 0.2% | 0.2% | 0.2% |
| Limestone | 29.1% | 0% | 0% | 28.7% | 0% | 0% | 0% | 27.9% | 0% | 0% | 0% | 0% |
| Quicklime | 0% | 18.3% | 0% | 0% | 0% | 0% | 0% | 0% | 0% | 0% | 0% | 0% |
| Calcium Silicate | 0% | 0% | 39.9% | 0% | 39.1% | 39.0% | 27.0% | 0% | 37.9% | 37.9% | 26.5% | 26.6% |
| Volcanic Glass | 0% | 0% | 0% | 14.9% | 11.8% | 17.0% | 4.2% | 14.7% | 16.8% | 16.8% | 0% | 0% |
| Diatomaceous Earth (DE) | | | | | 5.5% | 17.4% | 0% | 0% | 5.7% | 20.0% | 0% | |
| Plagioclase Feldspar | | | | | 0% | 38.3% | 0% | 0% | 0% | 40.1% | 40.1% | |
| Slag | | | | | 0% | 0% | 2.0% | 2.0% | 2.0% | 0% | 0% | |
| Total | 100% | 100% | 100% | 100% | 100% | 100% | 100% | 100% | 100% | 100% | 100% | 100% |
| Volume of $CO_2$ @ 1400 C. | 1668 | 0 | 0 | 1647 | 0 | 0 | 0 | 1624 | 0 | 0 | 0 | 0 |

The term "air-fuel burner" means a combustion burner that combusts one or more fuels with only air, while the term "oxy-fuel burner" means a combustion burner that combusts one or more fuels with either oxygen alone, or employs oxygen-enriched air, or some other combination of air and oxygen, including combustion burners where the primary oxidant is air, and secondary and tertiary oxidants are oxygen. Burners may be comprised of metal, ceramic, ceramic-lined metal, or combination thereof. "Air" as used herein includes ambient air as well as gases having the same molar concentration of oxygen as air. "Oxygen-enriched air" means air having oxygen concentration greater than 21 mole percent. "Oxygen" includes "pure" oxygen, such as industrial grade oxygen, food grade oxygen, and cryogenic oxygen. Oxygen-enriched air may have 50 mole percent or more oxygen, and in certain embodiments may be 90 mole percent or more oxygen. Oxidants such as air, oxygen-enriched air, and pure oxygen may be supplied from a pipeline, cylinders, storage facility, cryogenic air separation unit, membrane permeation separator, or adsorption unit.

The term "fuel", according to this disclosure, means a combustible composition (either in gaseous, liquid, or solid form, or any flowable combination of these) comprising a major portion of, for example, methane, natural gas, liquefied natural gas, propane, atomized oil, powders or the like. Fuels useful in the disclosure may comprise minor amounts of non-fuels therein, including oxidants, for purposes such as premixing the fuel with the oxidant, or atomizing liquid fuels.

At least some of the burners may be floor-mounted, and in certain embodiments the floor-mounted burners may be positioned in one or more parallel rows substantially perpendicular to a longitudinal axis of the melter. In certain embodiments, the number of floor-mounted burners in each row may be proportional to width of the melter. In certain embodiments the depth of the melter may decrease as width of the melter decreases. In certain other embodiments, an intermediate location may comprise a constant width zone positioned between an expanding zone and a narrowing zone of the melter, in accordance with assignee's co-pending U.S. patent application Ser. No. 12/817,754, filed Jun. 17, 2010, published as US 20110308280 on Dec. 22, 2011.

At least some of the burners may be oxy-fuel burners. In certain embodiments the oxy-fuel burners may comprise one or more submerged oxy-fuel combustion burners each having co-axial fuel and oxidant tubes forming an annular space there between, wherein the outer tube extends beyond the end of the inner tube, as taught in U.S. Pat. No. 7,273,583. In certain other embodiments the oxy-fuel burners may comprise one or more adjustable flame submerged oxy-fuel combustion burners as taught in assignee's co-pending U.S. patent application Ser. No. 13/268,028, filed Oct. 7, 2011.

In certain embodiments, the melter apparatus may have a floor size for a given throughput of 2 ft$^2$/stpd or less, and in certain embodiment may have a floor size for a given throughput of 0.5 ft$^2$/stpd or less, where "stpd" means "short tons per day." Stated differently, in certain embodiments, the methods herein may comprise discharging at least 0.5 short tons per day per square foot of melter floor, and in certain exemplary processes, at least 2 short tons per day per square foot of melter floor.

The term "fluid-cooled" means cooling using gaseous, liquid, or combination thereof, heat transfer media. In certain exemplary embodiments, wherein the melter wall comprises fluid-cooled panels, the wall may comprise a refractory liner at least between the panels and the molten glass.

Certain exemplary apparatus and methods may comprise cooling various components using fluid-cooled refractory panels and directing a heat transfer fluid through the panels. In certain embodiments, the refractory cooled-panels comprising the walls, the fluid-cooled skimmer, the fluid-cooled dam, and the walls of the fluid-cooled transition channel may be cooled by a heat transfer fluid selected from the group consisting of gaseous, liquid, or combinations of gaseous and liquid compositions that functions or is capable of being modified to function as a heat transfer fluid. Different cooling fluids may be used in the various components, or separate portions of the same cooling composition may be employed in all components. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids, which may be organic, inorganic, or some combination thereof, for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Referring now to the figures, FIG. 1 illustrates system embodiment 100 comprising a melter having a floor 102, a roof or ceiling 104, a feed end wall 106A having a feed opening 105, and a first portion of an exit end wall 106B. System embodiment 1 further includes an exhaust stack 108, and openings 110 for two floor-mounted and one sidewall-mounted submerged combustion burners 112, which create during operation a highly turbulent melt indicated at 114, with a turbulent surface 115. An average molten surface is indicated in dashed line 107. In certain embodiments, floor-mounted burners 112 may be positioned to emit combustion products into molten glass in the melting zone 114 in a fashion so that the gases penetrate the melt generally perpendicularly to floor 102. In other embodiments, one or more floor-mounted burners 112 may emit combustion products into the melt at an angle to floor 102, where the angle may be more or less than 45 degrees, but in certain embodiments may be 30 degrees, or 40 degrees, or 50 degrees, or 60 degrees, or 70 degrees, or 80 degrees. Burners 112 may be air-fuel burners or oxy-fuel burners, or some combination thereof. Embodiment 100 further includes a melter exit structure 128 for discharging the molten glass or similar material. Melter exit structure 128 is positioned generally downstream of melter exit end 106B, as illustrated of FIG. 1, and may fluidly and mechanically connect the melter vessel to a molten glass conditioning channel (not illustrated).

System 100 comprises a source chamber 6 for sourcing raw feed materials (for example glass batch) and a feed processing unit 4. Source chamber 6 defines an initial environment 7A, while feed processing unit 4 defines a second environment 7B. In initial environment 7A the feed materials are at a first density, while in second environment 7B the feed materials are transformed to have a second density greater than the first density, as well as having a degree of compaction, at least surface compaction, that work together to reduce fines from escaping up melter exhaust 108 during operation of system 100. Densified material, for example densified E-glass batch, enters the melter through a feed chute 134.

The initial raw material may be introduced into the melters of the systems of the present disclosure on a batch, semi-continuous or continuous basis. In some embodiments a "batch blanket" 136 may form along wall 106A, as illustrated schematically in FIGS. 2-4. Feed port 105 may be positioned above the average glass melt level, indicated by dashed line 107. The amount of the initial raw material introduced into the melter is generally a function of, for example, the capacity and operating conditions of the melter as well as the rate at which the molten material is removed from the melter.

The initial raw material may include any material suitable for forming molten glass such as, for example, glass batches comprising combinations of limestone, sand, trona, lime, albite, orthoclase dolomite, borax, soda ash, feldspar, and the like, and mixtures thereof. In certain embodiments, the initial raw materials may include batch components suitable for producing "E-glass" fibers, which typically include 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's published U.S. applications 20070220922 and 20080276652. The initial raw material can be provided in any form such as, for example, relatively small particles.

Referring now to FIG. 2, system embodiment 200 includes feed end wall 106A and exit end wall portions 106B and 106C, where end wall portions 106A and 106B may form angles "α" and "β", respectively, with respect to floor 102, as indicated. Angles α and β may be the same or different, and generally may range from about 30 degrees to about 90 degrees, or from about 45 degrees to about 75 degrees. Decreasing these angles beyond these ranges may require more floor space for the melters, and/or more material of construction, both of which are generally undesirable. Increasing these angles may promote dead spaces in corners, which is also undesirable. Exit end wall portion 106C may form an angle "γ" with respect to skimmer 118. Angle γ may be the range from 0 to about 70 degrees, or from about 30 degrees to about 75 degrees. Increasing this angle beyond these ranges may require more floor space for the melters, and/or more material of construction, both of which are generally undesirable. Decreasing this angle may promote escape of unmelted or melted material up stack 108, or deposition onto internal surfaces of stack 108, both of which are also undesirable. A frozen and/or highly viscous glass layer or layers 116 may be formed on the inside surfaces of walls 106A, 106B, due to the use of fluid-cooled panels for these walls. One or more or all of walls 106A, 106B, 106C, floor 102, and roof 104 may be comprised of a metal shell 117 and a fluid-cooled refractory panel 119.

A melter exit structure 128 for discharging the molten glass or similar material is provided in system 200. Melter exit structure 128 is positioned generally downstream of melter exit ends 106B, 106C as illustrated of FIG. 2, and may fluidly and mechanically connect the melter vessel to a molten glass conditioning channel (not illustrated). Melter exit structure 128 may comprise a fluid-cooled transition channel 130, having generally rectangular cross-section in embodiment 200, although any other cross-section would suffice, such as hexagonal, trapezoidal, oval, circular, and the like. Regardless of cross-sectional shape, fluid-cooled transition channel 130 is configured to form a frozen glass layer or highly viscous glass layer, or combination thereof, on inner surfaces of fluid-cooled transition channel 130 and thus protect melter exit structure 128 from the mechanical energy imparted from the melter vessel to melter exit structure 128. Melter exit structure 128 may in certain embodiments comprise an essentially rectangular, fluid-cooled, ceramic or metallic box having a length L, a width W, a height H. In these embodiments, length L may range from about 5 to about 50 percent, or from about 10 to about 40 percent, of the entire length of the melter apparatus. The width W of melt exit structure 128 may be the same as the width of the melter apparatus, or may be less or more than the width of the melter apparatus. The height H may range from about 5 to about 50 percent, or from about 10 to about 40 percent, of the entire height of the melter apparatus, measured from floor 102 to ceiling 104. Melter length, width and height depend primarily on the amount of raw material to be fed, the amount of molten glass to be produced, and the desired throughputs mentioned herein.

Still referring to FIG. 2, a fluid-cooled skimmer 118 may be provided, extending downward from the ceiling of the melter vessel and positioned upstream of fluid-cooled transition channel 130. Fluid-cooled skimmer 118 has a lower distal end 120 extending a distance $L_s$ ranging from about 1 inch to about 12 inches (from about 2.5 cm to about 30 cm) below the average melt level 107. Fluid-cooled skimmer 118 may be configured to form a frozen glass layer or highly viscous glass layer, or combination thereof, on its outer surfaces. Skimmer lower distal end 120 defines, in conjunction with a lower wall of melter exit structure 128, a throat 131 of the melter vessel, throat 131 configured to control flow of molten glass from the melter vessel into melter exit structure 128. Preferably, throat 131 is arranged below average melt level 107. Molten material can be removed from melter exit structure 128 on a batch, semi-continuous basis or continuous basis. In an exemplary embodiment, the molten material continuously flows through throat 131 and generally horizontally through melter exit structure 128, and is removed continuously from melter exit structure 128 to a conditioning channel (not illustrated). Thereafter, the molten material can be processed by any suitable known technique, for example, a process for forming glass fibers.

Certain embodiments may include an overlapping refractory material layer 132 on at least the inner surface of fluid-cooled transition channel 130 that are exposed to molten material. In certain embodiments the overlapping refractory material may comprise a seamless insert of dense chrome, molybdenum, or other dense ceramic or metallic material. The dense chrome or other refractory material may be inserted into the melter exit structure and may provide a seamless transition from the melter vessel to a conditioning channel (not illustrated).

Another optional feature of system embodiment 100 is the provision of a fluid-cooled dam opening 122 in the upper wall or ceiling of melt exit structure 128. Dam opening 122 accommodates a movable, fluid-cooled dam 124, which is illustrated schematically in FIG. 2 in a retracted position. Dam 124 may be manipulated by a prime mover 126, such as one or more motors, jack screws, or the like. Fluid-cooled dam 124 comprises dimensions allowing the dam to be extended an entire distance from top to bottom of fluid-cooled transition channel 130 and completely isolate the melting zone of the melter vessel from the conditioning channel.

Referring again to FIG. 2, system 200 comprises a source chamber 6 for sourcing raw feed materials (for example glass batch) and a feed processing unit 4. Source chamber 6 defines an initial environment 7A, while feed processing unit 4 defines a second environment 7B. In initial environment 7A the feed materials are at a first density, while in second environment 7B the feed materials are transformed to have a second density greater than the first density, as well as having a degree of compaction, at least surface compaction, that work together to reduce fines from escaping up melter exhaust 108 during operation of system 100.

FIG. 2 illustrates a more detailed description of a feed processing unit useful in the systems and processes of the present disclosure. As in embodiment 100, a source chamber 6 is provided in which particulate solids are stored. System 200 includes a recirculation chamber 10 through which a screw feeder 12 extends. Screw feeder 12 includes a shaft 14, which may be tapered in some embodiments, and a thread 16, the pitch of which may vary as described below.

Screw feeder 12 includes a number of physically distinctive sections that are arranged in succession along its length. As described herein, the physical structure of each section is related to the function of that particular section.

A feed section 8 lies directly beneath source chamber 6 and communicates with it so that the particulate solids in source chamber 6 can freely descend into feeding section 8, which draws the particulate solids towards the left as illustrated schematically in FIG. 2. Feed section 8 has a structure that produces an increase in capacity in the direction of draw. In certain embodiments, this is accomplished by using a combination of variable screw pitch and variable shaft diameter, as illustrated schematically in FIG. 2. In alternative embodiments, either an increasing screw pitch or a decreasing shaft diameter may be used. In certain embodiments, the pitch should not exceed 0.6 times the maximum diameter of the threads.

Recirculation chamber 10 includes a feeder seal shroud 32 that connects recirculation chamber 10 with source chamber 6, and that closely surrounds feed seal section 18 of screw feeder 12. The purpose of this section of the screw feeder is to limit the intake of particulate material, to prevent overfeeding of material into recirculation chamber 10. In certain embodiments, feed seal section 18 may have a constant pitch which may be the same as the pitch of the immediately adjacent portion of feed section 8.

A conveying section 20 is located immediately downstream of feed seal section 18. It provides a buffer between feed seal section 18 and recirculation section 22 to prevent recirculated material from backing up the flow. For this reason, conveying section 20 may be given a sudden increase in pitch relative to feed seal section 18, and in certain embodiments, the pitch of conveying section 20 may equal the screw diameter. In certain embodiments, conveying section 20 runs about half full of solids, leaving excess capacity to accommodate recirculated material.

In certain embodiments, recirculation section 22 may have the same pitch as conveying section 20, and serves to push the recirculated material into the next section.

Recirculation chamber 10 may also include a high pressure shroud 28 that extends downstream. In the preferred embodiment, high pressure shroud 28 also extends upstream into recirculation chamber 10, and this portion of high pressure shroud 28 may include a large number of perforations 35. This perforated section allows the air to escape when the solids are brought under the larger pressure associated with the screw in high pressure shroud 28. In some applications, depending on the properties of the specific material and the degree of deaeration desired, the perforated portion of the high pressure shroud can be eliminated.

As best illustrated schematically in FIG. 2A, screw feeder 12 occupies the bottom part of recirculation chamber 10. Parallel vertical walls 34, 36 rise from either side of screw feeder 12. It is very important that walls 34, 36 not converge downwardly, because that could lead to bridging of the material above screw feeder 12 in recirculation chamber 10. In certain embodiments walls 34 and 36 may either be vertical, or have a slight downward divergence.

The space between walls 34, 36 frequently fills with solids, and the weight of these solids provides the compacting head for the deaeration that occurs in this region. As seen in FIG. 2A, above walls 34, 36, recirculation chamber 10 expands to insure gas disengagement. In most cases this expansion is not necessary since the air flow is usually very small.

The downstream end 30 of high pressure shroud 28 is blocked by a preloaded cover 38 that is urged against the end 30 by a pneumatic ram 40. Compaction of the solid particulate material occurs as the material is pushed by high pressure section 24 of screw feeder 12 against preloaded cover 38. As the material is being thus compressed, the air or other gas entrained in the material is forced back into recirculation section 22 from which it is vented. Some of the solid material also is carried along with the expressed air and is carried with the air back into recirculation chamber 10, where it eventually settles back into screw feeder 12.

In certain embodiments, the threads of high pressure section 24 of screw feeder 12 do not extend all the way to the end 30 of high pressure shroud 28. This leaves a section 26 that is called the seal section. This section provides a seal against the air pressure in high pressure section 24 and pressure downstream of the screw.

As the screw is operated, the pressure in feed seal section 18 initially increases until it overcomes the pressure of the preloading force supplied by pneumatic ram 40, after which a steady flow of compacted material emerges under pressure from the end 30 of high pressure shroud 28. In certain embodiments, a sloping chute 44 may be attached to the end 30 of high pressure shroud 28 to transfer the densified, compacted solids and to prevent them from freely falling, which would result in re-entrainment of air. Sloping chute 44 may form an angle to screw feeder 12 that is the same or different than angle α, and in certain embodiments the angle are supplementary, in other words if angle α is 30 degrees, then the angle that chute 44 makes with screw feeder 12 maybe 150 degrees.

A number of variations are possible on the embodiment 200. For example, the feeding section 8 could be shortened sufficiently to dispense with the variable pitch and diameter, and this section could then be replaced with a constant-pitch screw.

The sudden increase in capacity required in conveying section 20 could be accomplished with a sudden decrease in the shaft diameter instead of an increase in the pitch of the screw.

In some embodiments, the perforated high pressure shroud 28 can be completely eliminated.

In addition to compacting and deaerating a solid particulate material, the screw feeder illustrated schematically in FIGS. 2 and 2A may also be used to replace one entrained gas by another; for example, air could be replaced by an inert gas such dry nitrogen, an oxidant such as dry oxygen, or other gas or gas combination.

The gas to be added may be introduced through gas injection nozzles 46, 48 and 50, while the gas being removed, along with some of the replacement gas is discharged through the vent 52.

Figure 3:
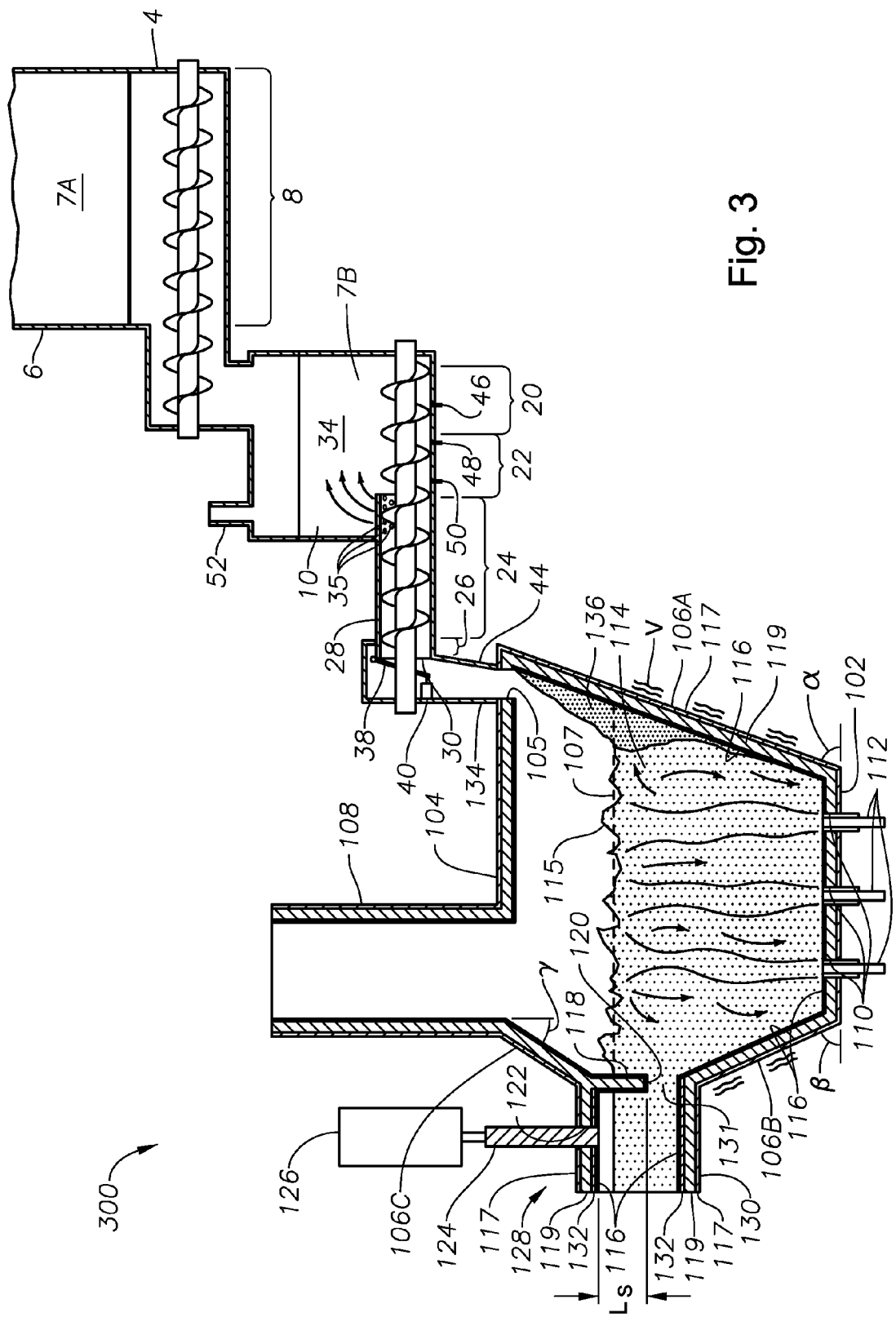

Yet another variation is shown in the alternative embodiment 300 of FIG. 3. In that embodiment, source chamber 6 is located above, and discharges into, recirculation chamber 10, at a location above conveying section 20. The action and structure of recirculation section 22 and high pressure section 24 are the same as embodiment 200 illustrated schematically in FIG. 2. Compared to embodiment 200, embodiment 300 illustrated schematically in FIG. 3 permits the rate at which the particulate solids are supplied to the submerged combustion melter to be controlled independently of the rate at which screw feeder 20 is rotating. In embodiment 300 illustrated schematically in FIG. 3, this control of the supply may be accomplished by controlling the speed of feeder 8.

Certain other embodiments may comprise increasing temperature of the composition being densified during the densifying to release bound water from one or more of the batch components of the composition being densified, and using the released bound water as a binding agent to maintain compaction of the composition being densified. The increase in temperature may comprise increasing the temperature of the composition being densified from its temperature in environment 7A to a temperature greater than 100° C., or greater than 110° C., or from about 100 to about 120° C. Temperature may be increased in any of a number of ways, using components such as, for example, electrical heating elements, steam heating via a steam jacket, radiant heating using burners, and similar methods. Yet other embodiments may comprise decreasing pressure of the composition being densified during the densifying to increase rate of compaction. The amount of pressure reduction would be that amount of pressure reduction to effect a noticeable increase in rate of compaction, and may entail reducing the pressure in environment 7B to less than atmospheric pressure, for example, to 10 psia (70 KPa absolute), or to 5 psia (35 KPa absolute). In certain embodiments, the reduction of pressure and increase in temperature may be employed simultaneously, or in series.

Figure 4:
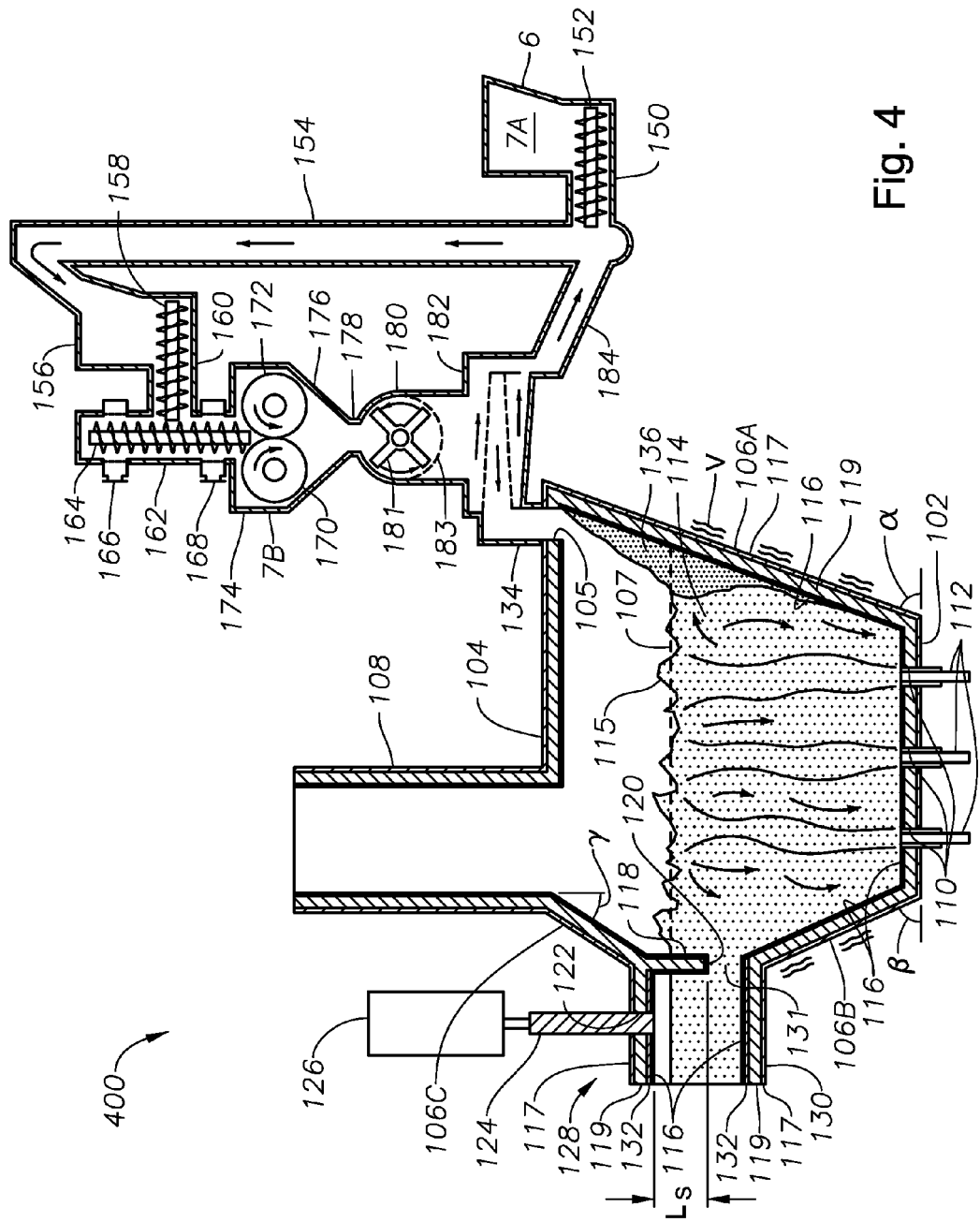

Other embodiments may densify and compact glass batch using other equipment, such as roll compactors, briquetting rolls, roll presses, and similar machines. An example of such a glass batch densification sub-system is illustrated in FIG. 4. FIG. 4 illustrates schematically yet another system embodiment 400 in accordance with the present disclosure. System 400 differs from systems 200 and 300 in manner in which the raw materials are densified. System 400 utilizes a feed processing unit such as available from The Fitzpatrick Company, Elmhurst, Ill., (USA). A source chamber 6 feeds a primary feed screw section 150 comprising a primary feed screw 152, the latter feeding glass batch to a feed elevator 154. Feed elevator 154 may comprised an enclosed column including a series of buckets or cups (not illustrated) on an endless chain-type conveying system inside the column. As illustrated by the arrows, glass batch moves upwards through feed elevator 154 and is dumped into a feed metering chamber 156. A metering screw 158 in a metering screw section 160 advances glass batch substantially horizontally into a substantially vertical deaerating screw section 162, which may include one or more vents 166, 168. Vents 166, 168 allow air to escape as a deaerating screw 164 feeds material being densified downward into a second environment 7B and between two counter rotating rolls 170, 172. Rolls 170 and 172 are forced together inside of a densifying housing 174. Densified material falls into a conical section 176 and a pre-feed chute 178. Optionally, vents 166, 168 may be fluidly attached to a vacuum or low pressure generation system, allowing the decrease in pressure discussed herein.

In certain embodiments pre-feed chute 178 may feed densified material directly into feed chute 134 of the submerged combustion melter without further modification, with densified material exiting the nip of rolls 170, 172 taking the form of sticks, sheets, or briquettes, depending on the type of roll surfaces of rolls 170, 172. These types of rolls are known in the solids handling arts and require no further explanation here. In other embodiments, densified feed materials exiting the nip of rolls 170, 172, of whatever form, may be further processed by an optional granulator 180, which typically has a rotor and one or more granulator blades 181 and a granulator screen 183. Since the granulated, densified material exiting screen 183 may have a large particle size distribution, from fines to large particles, the granulated, densified material is preferably classified in a separator 182 into "overs", acceptable size particles (which are passed through feed chute 134 into the submerged combustion melter), and fines, the latter which are recirculated to feed elevator 154 via a recirculation chute 184.

Figure 5:
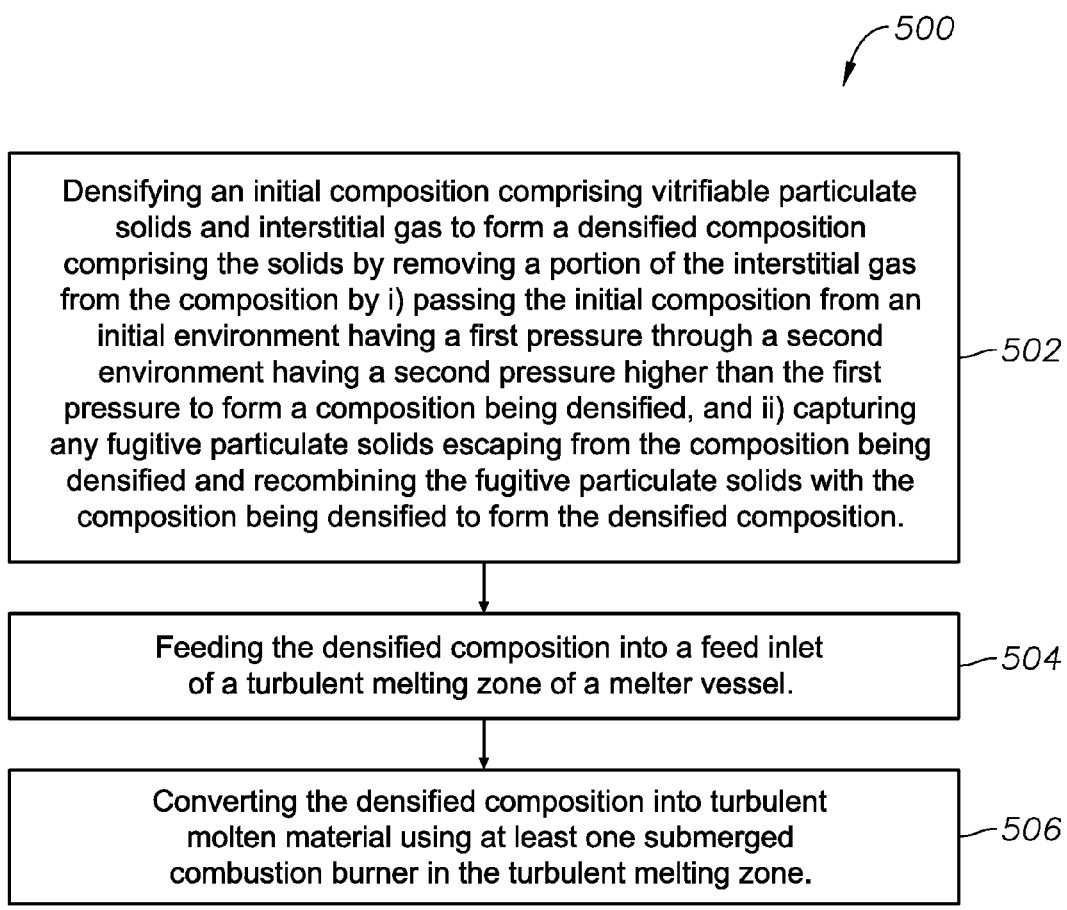
FIGS. 5, 6, and 7 are logic diagrams illustrating processes in accordance with the present disclosure.
Figure 6:
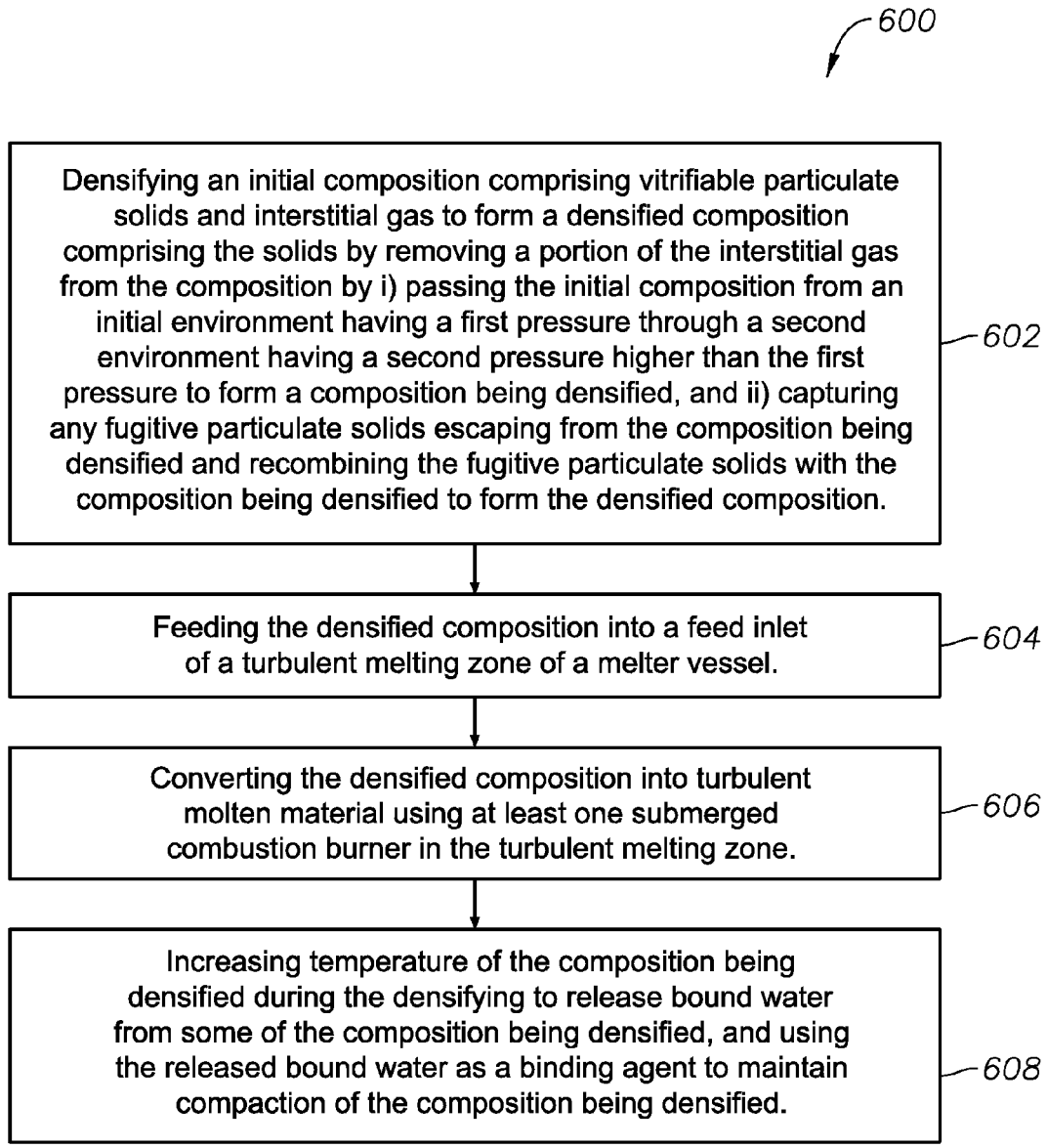
Figure 7:
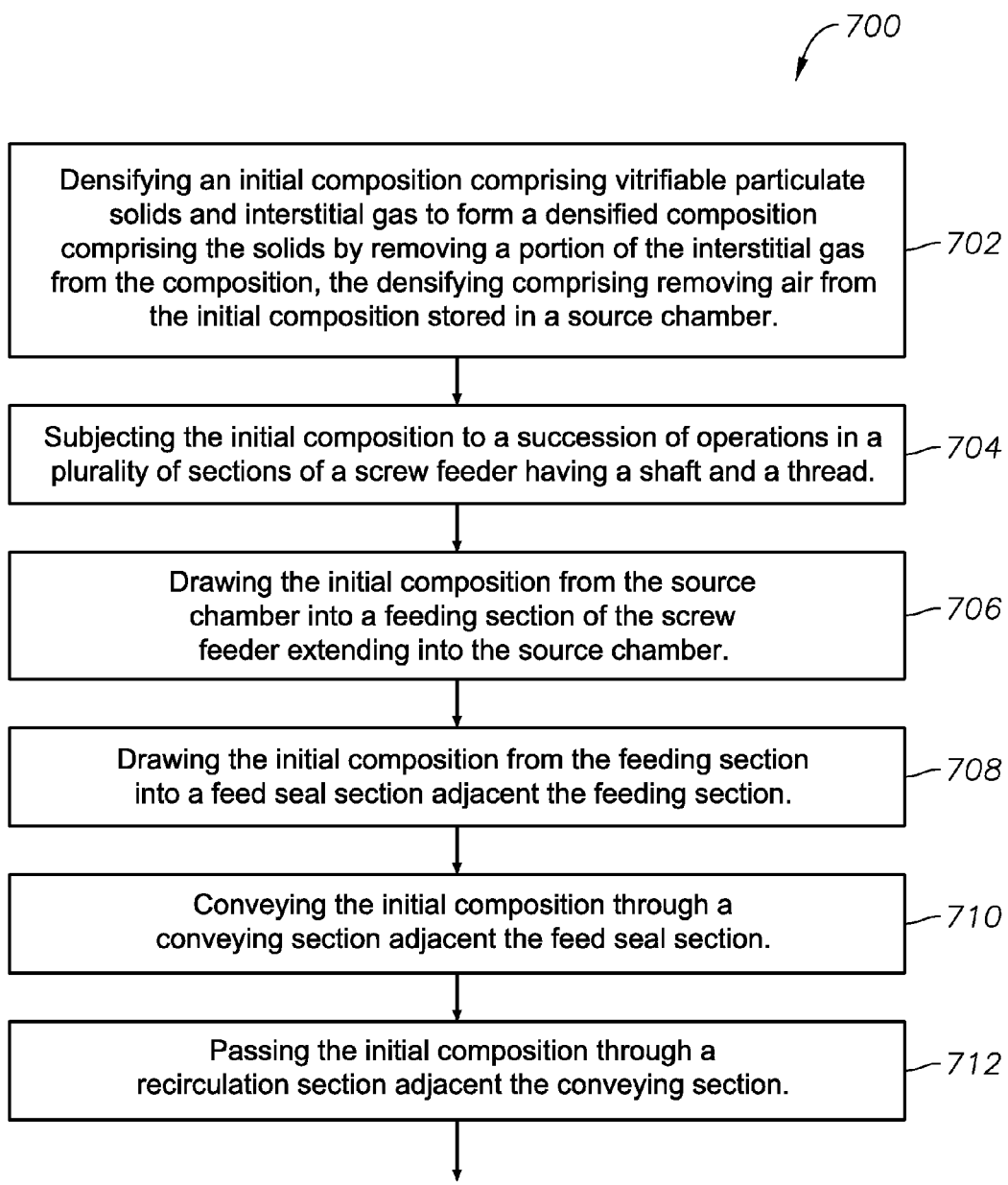
Figure 7:
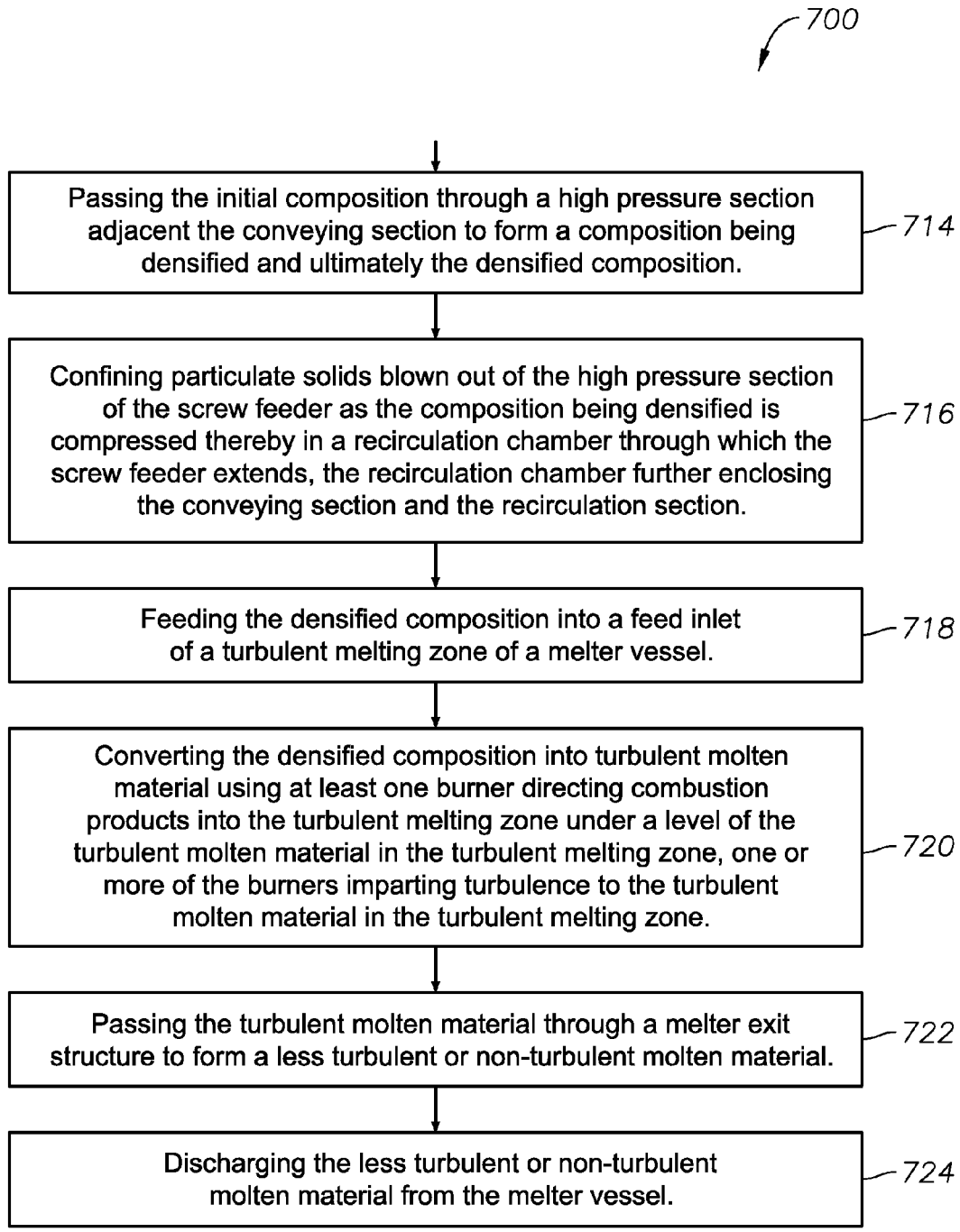

FIGS. 5, 6, and 7 are logic diagrams illustrating three non-limiting processes in accordance with the present disclosure. It should be emphasized that all steps of the various process embodiments need not be carried out in series or succession. Process embodiment 500 of FIG. 5 includes the steps of densifying an initial composition comprising vitrifiable particulate solids and interstitial gas to form a densified composition comprising the solids by removing a portion of the interstitial gas from the composition by i) passing the initial composition from an initial environment having a first pressure through a second environment having a second pressure higher than the first pressure to form a composition being densified, and ii) capturing any fugitive particulate solids escaping from the composition being densified and recombining the fugitive particulate solids with the composition being densified to form the densified composition (box 502). Process embodiment 500 also includes feeding the densified composition into a feed inlet of a turbulent melting zone of a melter vessel (box 504), and converting the densified composition into turbulent molten material using at least one submerged combustion burner in the turbulent melting zone (box 506).

Process embodiment 600 of FIG. 6 includes the steps of densifying an initial composition comprising vitrifiable particulate solids and interstitial gas to form a densified composition comprising the solids by removing a portion of the interstitial gas from the composition by i) passing the initial composition from an initial environment having a first pressure through a second environment having a second pressure higher than the first pressure to form a composition being densified, and ii) capturing any fugitive particulate solids escaping from the composition being densified and recombining the fugitive particulate solids with the composition being densified to form the densified composition (box 602). Process embodiment 600 also includes feeding the densified composition into a feed inlet of a turbulent melting zone of a melter vessel (box 604), and converting the densified composition into turbulent molten material using at least one submerged combustion burner in the turbulent melting zone (box 606). Process embodiment 600 also includes increasing temperature of the composition being densified during the densifying to release bound water from some of the composition being densified, and using the released bound water as a binding agent to maintain compaction of the composition being densified (box 608).

Process embodiment 700 of FIG. 7 includes the steps of densifying an initial composition comprising vitrifiable particulate solids and interstitial gas to form a densified composition comprising the solids by removing a portion of the interstitial gas from the composition, the densifying comprising removing air from the initial composition stored in a source chamber (box 702). Process embodiment 700 also includes subjecting the initial composition to a succession of operations in a plurality of sections of a screw feeder having a shaft and a thread (box 704), drawing the initial composition from the source chamber into a feeding section of the screw feeder extending into the source chamber (box 706), and drawing the initial composition from the feeding section into a feed seal section adjacent the feeding section (box 708).

Process embodiment 700 further includes conveying the initial composition through a conveying section adjacent the feed seal section (box 710), passing the initial composition through a recirculation section adjacent the conveying section (box 712), and passing the initial composition through a high pressure section adjacent the conveying section to form a composition being densified and ultimately the densified composition (box 714). Process embodiment 700 further includes confining particulate solids blown out of the high pressure section of the screw feeder as the composition being densified is compressed thereby in a recirculation chamber through which the screw feeder extends, the recirculation chamber further enclosing the conveying section and the recirculation section (box 716).

Process embodiment 700 further comprises feeding the densified composition into a feed inlet of a turbulent melting zone of a melter vessel (box 718), and converting the densified composition into turbulent molten material using at least one burner directing combustion products into the turbulent melting zone under a level of the turbulent molten material in the turbulent melting zone, one or more of the burners imparting turbulence to the turbulent molten material in the turbulent melting zone (box 720). Process embodiment 700 concludes by passing the turbulent molten material through a melter exit structure to form a less turbulent or non-turbulent molten material (box 722), and discharging the less turbulent or non-turbulent molten material from the melter vessel (box 724).

In operation of systems of this disclosure, feed material, such as E-glass batch (melts at about 1400° C.), insulation glass batch (melts at about 1200° C.), and the like, is processed in a feed processing unit as described, producing densified material, then fed to the melter through a feed chute and melter inlet. Scrap in the form of glass fiber mat and/or insulation having high organic binder content, glass cullet, and the like may be separately fed to the melter. One or more submerged combustion burners are fired to melt the feed materials and to maintain a turbulent molten glass melt. Molten glass moves toward melter exit structure, and is discharged from the melter. Combustion product gases (flue gases) exit through stack, or may be routed to heat recovery apparatus, as discussed herein. If oxy-fuel combustion is employed in some or all burners, the general principle is to operate combustion in the burners in a manner that replaces some of the air with a separate source of oxygen. The overall combustion ratio may not change. Throughput of melter apparatus described in the present disclosure may be 0.5 short ton per day per $ft^2$ of melter footprint (0.5 stpd/$ft^2$) or more, and in some embodiments 2 stpd/$ft^2$ or more. This is at least twice, in certain embodiments ten times the throughput of conventional melter apparatus.

Processes and systems of the present disclosure may be controlled in a number of different manners. In certain embodiments a master controller may be employed, but the processes and systems described herein are not so limited, as any combination of controllers could be used. The controller may be selected from PI controllers, PID controllers (including any known or reasonably foreseeable variations of these), and may compute a residual equal to a difference between a measured value and a set point to produce an output to one or more control elements. The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may compute the residual continuously or non-continuously. Other possible implementations of the processes and systems of the present disclosure are those wherein the controller may comprise more specialized control strategies, such as strategies selected from feed forward, cascade control, internal feedback loops, model predictive control, neural networks, and Kalman filtering techniques. The controller may receive input signals from, and provide output signals for, for example, but not limited to, the following parameters: velocity of fuel entering a burner; velocity of primary oxidant entering a burner; velocity of secondary oxidant entering a burner; mass flow rate of fuel entering a burner; mass flow rate of primary oxidant entering a burner; temperature of fuel entering a burner; temperature of primary oxidant entering a burner; temperature of densifying section, pressure reduction in densifying section, pressure of primary oxidant entering a burner; humidity of primary oxidant; feed rate of material into the melter, flow rate of molten material out of the melter, mass flow rate of hot effluent exhaust, mass flow rates of input and output heat transfer fluids for fluid-cooled panels, and the like. Burner geometry, densified solids geometry and flow rate, batch flow rate into a feed processing unit, and combustion ratio are other examples of input signals.

Submerged combustion burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Exemplary processes and systems of the disclosure comprise a combustion controller which receives one or more input parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, pressure of the oxidant entering the burner, humidity of the oxidant, burner geometry, oxidation ratio, temperature of the effluent and combinations thereof, and employs a control algorithm to control combustion temperature based on one or more of these input parameters.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to control elements, and/or to local devices associated with control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The burners used for submerged combustion may provide an amount of heat which is effective to melt the initial raw material to form the molten material 114, and to maintain the molten material 114 in its molten state. The optimal temperature for melting the initial raw material and maintaining the molten material 114 in its molten state can depend on, for example, the composition of the initial raw material and the rate at which the molten material 114 is removed from the melter apparatus. For example, the maximum temperature in the melter apparatus can be at least about 1400° C., preferably from about 1400° C. to about 1650° C. The temperature of the molten material 14 can be from about 1050° C. to about 1450° C.; however, systems and processes of the present disclosure are not limited to operation within the above temperature ranges. The molten material 114 removed from the melter apparatus is typically a substantially homogeneous composition, but is not limited thereto.

Submerged combustion burners useful in the systems and processes described herein include those described in U.S. Pat. Nos. 4,539,034; 3,170,781; 3,237,929; 3,260,587; 3,606,825; 3,627,504; 3,738,792; 3,764,287; 7,273,583, and assignee's U.S. patent application Ser. No. 13/268,028, filed Oct. 7, 2011, all of which are incorporated herein by reference in their entirety. One useful burner, for example, is described in assignee's '028 application, and comprises a first conduit comprising a first end, a second end, a longitudinal bore having a longitudinal axis, and an external surface, a second conduit substantially concentric with the first conduit, the second conduit comprising a first end, a second end, and an internal surface, the first and second conduits configured to form a primary annulus between the external surface of the first conduit and the internal surface of the second conduit. The burner further comprises an adjustable structure comprising a body having an upper surface, a lower surface, a circumferential surface abutting a portion of the internal surface of the second conduit, and a generally cylindrical central hub concentric with the longitudinal axis. The structure may be adjustable axially in relation to and removably attached to the first end of the first conduit via the hub, the hub defining a central passage having an exit at the upper surface, the body comprising one or more non-central through passages extending from the lower to the upper surface. The non-central passages may be configured such that flow of a first fluid through the non-central passages causes the first fluid to intersect a flow of a second fluid in a mixing region above the upper surface of the body.

Regardless of the burner type selected, the general idea is for the burners to provide heat energy to a bath of molten material and simultaneously create a well-mixed, turbulent molten material. The burners function by firing a burning gaseous or liquid fuel-oxidant mixture into a volume of molten material. The burners described in the 583 patent provide a stable flame at the point of injection of the fuel-oxidant mixture into the melt to prevent the formation of frozen melt downstream as well as to prevent any resultant explosive combustion, and constant, reliable, and rapid ignition of the fuel-oxidant mixture such that the mixture burns quickly inside the molten material and releases the heat of combustion into the melt. Completion of the combustion process results in bubbles rising to the surface of the turbulent melt. The location of the injection point for the fuel-oxidant mixture below the surface of the melting material enhances mixing of the components being melted and increases homogeneity of the melt. Thermal $NO_x$ emissions are greatly reduced due to the lower flame temperatures resulting from the melt-quenched flame and further due to insulation of the high temperature flame from the atmosphere.

Melter apparatus useful in processes and systems in accordance with the present disclosure may also comprise one or more wall-mounted submerged combustion burners, and/or one or more roof-mounted burners. Roof-mounted burners may be useful to pre-heat the melter apparatus melting zone 114 and may serve as ignition sources for one or more submerged combustion burners 112. Melter apparatus having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners 112. In certain embodiments, despite the improvement in glass batch densification described herein, if there remains a possibility of carryover of batch particles to the exhaust, one or more roof-mounted burners could be used to form a curtain to reduce or prevent particulate carryover. One benefit of the processes and systems of the present disclosure is the possible elimination of these burners. In certain embodiments, all submerged combustion burners 112 are oxy-fuel burners (where "oxy" means oxygen, or oxygen-enriched air, as described earlier), but this is not necessarily so in all embodiments; some or all of the submerged combustion burners may be air-fuel burners. Furthermore, heating may be supplemented by electrical heating in certain embodiments, in certain melter zones.

The total quantities of fuel and oxidant used by the combustion system are such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2, inclusive of the end numbers, and possibly higher or lower in certain embodiments. In certain embodiments, the equivalent fuel content of the feed material must be taken into account. For example, organic binders in glass fiber mat scrap materials will increase the oxidant requirement above that required strictly for fuel being combusted. In consideration of these embodiments, the combustion ratio may be increased above 1.2, for example to 1.5, or to 2, or 2.5, or even higher, depending on the organic content of the feed materials.

The velocity of the fuel in the various submerged combustion burners depends on the burner geometry used, but generally is at least about 15 m/s. The upper limit of fuel velocity depends primarily on the desired mixing of the melt in the melter apparatus, melter geometry, and the geometry of the burner; if the fuel velocity is too low, the flame temperature may be too low, providing inadequate melting, which is not desired, and if the fuel flow is too high, flame might impinge on the melter floor, roof or wall, and/or heat will be wasted, and/or batch fines may shirt-circuit the melter and escape through the stack (despite the feed densification discussed herein) which is also not desired, and/or the degree of turbulence may so great as to be detrimental to refractory, or other materials of construction. High turbulence may also produce an undesired amount of foam or bubbles in the melt that cannot be refined out of the melt if the conditioning facilities are not adequate.

Those of skill in this art will readily understand the need for, and be able to construct suitable fuel supply conduits and oxidant supply conduits, as well as respective flow control valves, threaded fittings, quick connect/disconnect fittings, hose fittings, and the like.

In certain embodiments of the disclosure it may be desired to implement heat recovery. In embodiments of the disclosure employing a heat transfer fluid for heat recovery, it is possible for a hot intermediate heat transfer fluid to transfer heat to the oxidant or the fuel of submerged combustion burners either indirectly by transferring heat through the walls of a heat exchanger, or a portion of the hot intermediate fluid could exchange heat directly by mixing with the oxidant or the fuel. In most cases, the heat transfer will be more economical and safer if the heat transfer is indirect, in other words by use of a heat exchanger where the intermediate fluid does not mix with the oxidant or the fuel, but it is important to note that both means of exchanging heat are contemplated. Furthermore, the intermediate fluid could be heated by the hot flue gases by either of the two mechanisms just mentioned.

In certain embodiments employing heat recovery, the primary means for transferring heat may comprise one or more heat exchangers selected from the group consisting of ceramic heat exchangers, known in the industry as ceramic recuperators, and metallic heat exchangers further referred to as metallic recuperators. Apparatus and methods in accordance with the present disclosure include those wherein the primary means for transferring heat are double shell radiation recuperators. Preheater means useful in apparatus and methods described herein may comprise heat exchangers selected from ceramic heat exchangers, metallic heat exchangers, regenerative means alternatively heated by the flow of hot intermediate fluid and cooled by the flow of oxidant or fuel that is heated thereby, and combinations thereof. In the case of regenerative means alternately heated by the flow of hot intermediate fluid and cooled by the flow of oxidant or fuel, there may be present two vessels containing an inert media, such as ceramic balls or pebbles. One vessel is used in a regeneration mode, wherein the ceramic balls, pebbles or other inert media are heated by hot intermediate fluid, while the other is used during an operational mode to contact the fuel or oxidant in order to transfer heat from the hot media to the fuel or oxidant, as the case might be. The flow to the vessels is then switched at an appropriate time.

Melter apparatus described in accordance with the present disclosure may be constructed using only fluid-cooled refractory panels, with or without a thin refractory "glass-contact" liner. The thin refractory liner may be 1 centimeter, 2 centimeters, 3 centimeters or more in thickness, however, greater thickness may entail more expense without resultant greater benefit. The refractory liner may be one or multiple layers. Alternatively, melters described herein may be constructed using cast concretes such as disclosed in U.S. Pat. No. 4,323,718. The thin refractory linings discussed herein may comprise materials described in the 718 patent, which is incorporated herein by reference. Two cast concrete layers are described in the 718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the refractory cooled panels, melter refractory liners, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the melter geometry and type of glass to be produced.

EXAMPLE

Figure 8:
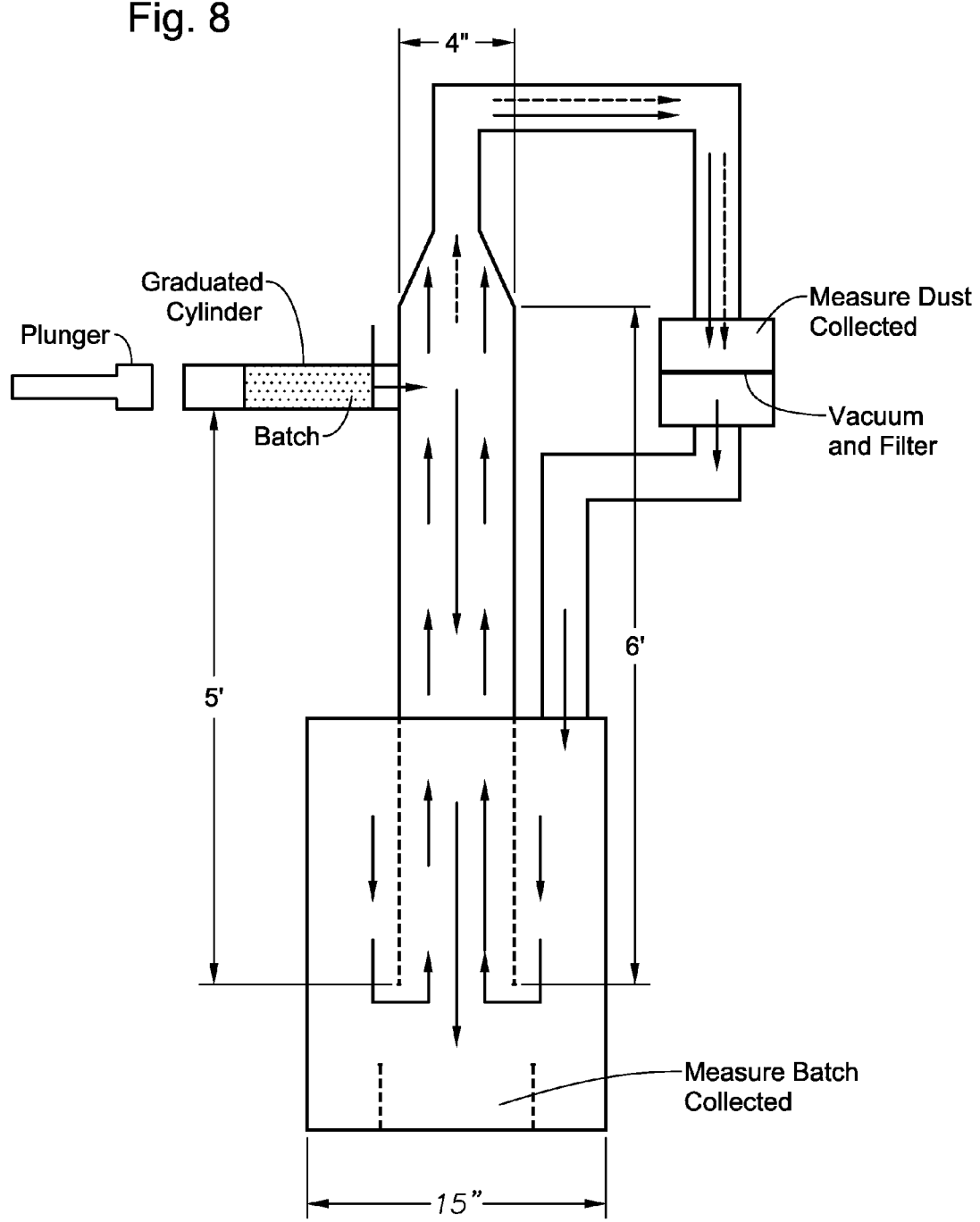
FIG. 8 is a schematic illustration of a laboratory-scale apparatus that was designed and constructed to replicate air velocities inside a submerged combustion melter and exhaust system.

Lab scale testing with E-glass batch materials was used to demonstrate that increased E-glass batch bulk density results in lower batch loss. To understand the factors that affect the amount of batch loss in an SCM, the apparatus in FIG. 8 was designed and constructed to replicate the types of air velocities inside an SCM and exhaust system. The concept of the apparatus was to charge (drop) a known amount of batch material into an air steam moving at a known velocity in the opposing direction of the batch falling. By measuring the amount of batch material that reached the target box at the bottom of the apparatus, the amount of lost material could be calculated. Losses were defined as all material that did not reach the target box, excluding any material that failed to enter the airstream. The large diameter tubing was constructed of clear plastic (such as polycarbonate) while the smaller diameter tubing was a small-diameter vacuum hose. The vacuum-producing device used was a "Bucket Head" produced by Emerson Tool Co. Model BH0100. The graduated cylinder was a 1000 mL plastic graduated cylinder with the bottom cut off. A plunger was used to compress the batch to the target volume/bulk density. The plunger was concrete with a threaded metal rod set in it as a handle. Duct tape was wrapped around the plunger to increase its diameter to achieve a sufficiently tight fit to push the majority of the material surface while loose enough to allow air to escape during sample compression.

Airflow was controlled via a vacuum used to create a closed-loop system. For repeat samples at the same setting, the filter was cleaned via vacuuming by a different vacuum. For each new setting, a new vacuum filter was used. For the base case air velocity measurements were made via a pilot tube and digital manometer. The air velocity within the air tube was measured to be 585 ft./minute (180 meters/minute). This set-up was modified to achieve and test the impact of lower velocities.

For the batch addition, a known mass of batch was added to a graduated cylinder where its volume could be measured to calculate its bulk density (mass/volume). When higher bulk densities were needed, the plunger was used to compress the batch to the target volume/bulk density. The graduated cylinder was then loaded onto the apparatus. With the vacuum running at steady-state, the mass of batch (500 to 800 grams) with the determined bulk density was manually pushed into the air tube using the plunger over a one to two second time frame. After the system reached equilibrium (10 seconds or so), the operator turned off the vacuum system and then measured the mass of the batch in the target box. Any batch that failed to enter the system in the initial injection was measured and subtracted from the starting batch weight.

The batch used in this experimentation was typical for E-glass batch used on an operating SCM and made of typical raw materials used for that SCM. Table 2 lists the general raw material descriptions and their percentages in the batch.

TABLE 2

Batch Composition Utilized in Entrainment Trials

| Material | Example Vendor/Product | % of Batch |
|---|---|---|
| Ground Silica | US Silica/Sil-Co-Sil 52 | 31.5% |
| Limestone | Lhoist/C85 | 27.8% |
| Kaolin Clay | Active Minerals/FG-5 | 29.5% |
| 5-Mol Borax | Rio Tinto/Neobor | 5.7% |
| BD Lime | Carmeuse/Grade 6 | 3.5% |
| Boric Acid | Rio Tinto/Optibor TG | 2.1% |

The variables tested to evaluate their impact on batch entrainment were bulk density, moisture content, particle size, and air velocity. Bulk density was tested by compacting batches to several target bulk densities: 47 lbs./ft$^3$ (0.75 g/cm$^3$) (uncompacted batch), 55 lbs./ft$^3$ (0.89 g/cm$^3$) and 65 lbs./ft$^3$ (1.0 g/cm$^3$). Spreading the batch onto a pan that was on a scale and misting water above the batch until the desired moisture level was achieved. Moisture levels tested were 0%, 2%, 5%, and 10% (all weight percent). Substituting coarse grades of the three major materials allowed the impact of particle size to be tested (sand was used in place of ground silica). Drilling holes in the inlet and outlet vacuum hoses changed air velocities. This reduced the air velocity in the drop tube to the targeted values.

Figure 9:
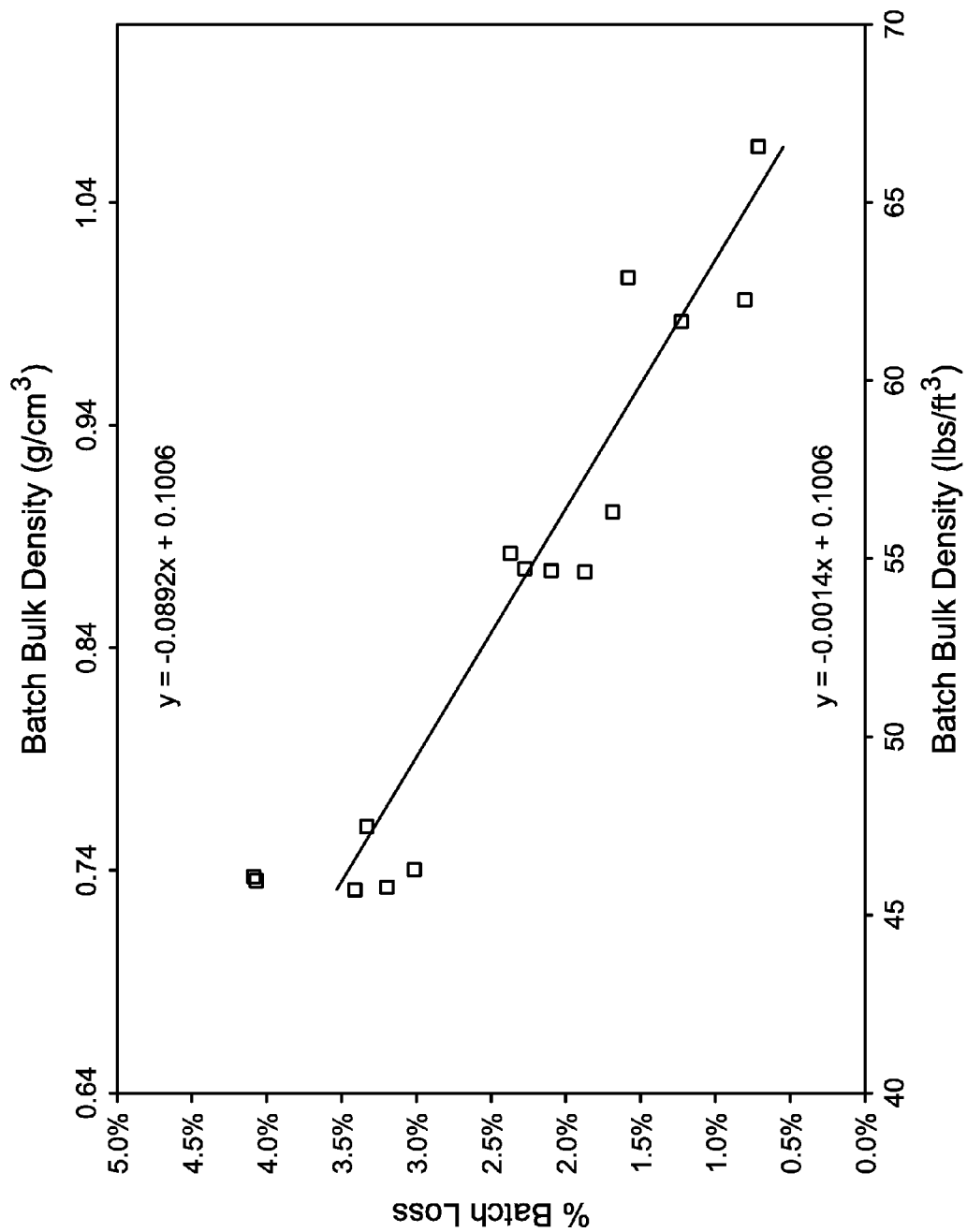
FIG. 9 is a graphical representation of batch bulk density vs. percent batch loss in accordance with the present disclosure, using the laboratory-scale feed compaction subsystem as described in the Example and illustrated schematically in FIG. 8.

FIG. 9 illustrates the general relationship between the batch bulk density and the amount of batch loss. By compacting the batch to higher bulk densities, the amount of batch lost due to the turbulent airflow was reduced by roughly two thirds.

Regarding moisture content, up to 5 wt % moisture content appears to reduce batch losses, but 10 wt % moisture showed no significant improvement in comparison to 5 wt % moisture.

Regarding the effect of changing individual batch components for components of similar chemistry but coarser particle size, a change from ground silica to whole-grain sand actually resulted in significantly greater batch loss. This was thought to be due to a reduction in the cohesion of the batch due to the coarseness of the sand grade. Coarser clay particles resulted in a significant reduction in batch loss, though it was not clear if this was due to the coarser particle size or the additional moisture brought in by this particle type of clay (added 2.5 wt % moisture to the batch). Coarser limestone did not yield significantly different results than the typical batch.

Regarding the relationship between air velocity and batch loss, the velocities chosen were intended to be within the range of velocities in the region near (or at) the exhaust stack in the SCM at various pull rates. Lower velocities yielded significant reductions in batch loss down to 205 ft./minute (60 meters/minute).

In sum of these laboratory scale tests, the most effective method of reducing batch entrainment appears to be to design the melter and exhaust system so as to minimize exhaust gas velocities within the target pull rate range. However, if velocities cannot be reduced, the next most effective method for reducing batch entrainment is to compact the batch to higher bulk density. Moisture was also effective up to 5 wt % of the batch weight, but adding additional moisture was ineffective. Using coarser sized particles was ineffective, except for coarser clay particles, though it was not determined as to whether this effect was due to the particle size or the additional moisture associated with the coarser clay.

Although only a few exemplary embodiments of this disclosure have been described in detail above, those skilled in the art will readily appreciate that many modifications are possible in the exemplary embodiments without materially departing from the novel apparatus and processes described herein. Accordingly, all such modifications are intended to be included within the scope of this disclosure as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A system comprising:
a) a melter vessel comprising a floor, a ceiling, and a wall connecting the floor and ceiling at a perimeter of the floor and ceiling, the wall comprising a feed end wall, a melter exit end wall, and two opposing sides walls, the walls, floor, and ceiling comprised of a metal shell and a fluid-cooled refractory panel, the melter vessel comprising a glass batch feed opening in the ceiling or in the feed end wall adjacent the ceiling and the melter exit end wall comprising a melter exit structure for discharging molten material formed in a turbulent melting zone, and one or more burners, at least one of which is positioned to direct combustion products into the turbulent melting zone under a level of turbulent molten material in the turbulent melting zone; and
b) a glass batch compacting screw feeder fluidly and mechanically coupled to the glass batch feed opening, the glass batch compacting screw feeder configured to treat glass batch to form a densified glass batch comprising glass batch solids by removing a portion of interstitial gas from the glass batch and feed the densified glass batch into the glass batch feed opening of the melter vessel in the turbulent melting zone;
the glass batch compacting screw feeder extending in a horizontal direction and including a number of sections arrayed in succession along its length so as to subject the glass batch to a succession of operations, the sections including:
a glass batch feeding screw section including a feed screw extending into a glass batch source chamber for drawing the glass batch from the glass batch source chamber and moving it into a glass batch feed seal screw section including a seal screw;
the glass batch feed seal screw section adjacent the glass batch feeding screw section, the glass batch feed seal screw section seal screw having substantially same pitch as the feed screw of the glass batch feeding screw section;
a glass batch conveying screw section adjacent the glass batch feed seal screw section and having conveying screw having a greater Ditch than a pitch of the seal screw to provide greater solids-moving capacity than the glass batch feed seal screw section;
a recirculation screw section adjacent the glass batch conveying screw section and having a recirculation screw having substantially same pitch as a pitch of the conveying screw;
a high pressure screw section having a high pressure screw having substantially same pitch as the pitch of the recirculation screw;
a recirculation chamber through which the feeder screw extends, the recirculation chamber including
a feeder seal shroud closely surrounding the feed seal screw section;
a high pressure shroud closely surrounding the high pressure screw section and having an output end;
the recirculation chamber further enclosing the glass batch conveying screw section and the recirculation screw section to confine particulate glass batch solids blown out of the high pressure screw section as the particulate glass batch solids are compressed thereby; and,
a hingedly mounted preloaded cover in yieldable sealing engagement with the output end of the high pressure shroud to permit the densified glass batch to emerge under pressure from the high pressure shroud.

2. The system of claim 1 further comprising a sloping chute attached to the output end of the high pressure shroud to prevent free-fall of the emerging densified glass batch.

3. The system of claim 1 wherein a portion of the high pressure shroud extends downstream beyond the high pressure screw section so that the glass batch composition being densified in that portion tends to act as a seal between the high pressure screw section and the output end of the high pressure shroud.

4. The system of claim 1 wherein a portion of the high pressure shroud extends upstream into the recirculation chamber.

5. The system of claim 1 wherein the portion of the high pressure shroud includes a plurality of perforations.

6. The system of claim 1 wherein the recirculation chamber has walls that extend upward from opposite sides of the screw feeder, the walls not diverging upwardly.

7. The system of claim 1 wherein the glass batch feeding screw section includes an increasing pitch in the direction of draw to produce an increase in capacity in that direction.

8. The system of claim 1 wherein the glass batch feeding screw section includes a decreasing shaft diameter in the direction of draw to produce an increase in capacity in that direction.

9. The system of claim 1 wherein the glass batch conveying screw section includes an increasing pitch in the direction of draw to produce an increase in capacity in that direction.

10. The system of claim 1 wherein the glass batch conveying screw section includes a decreasing shaft diameter in the direction of draw to produce an increase in capacity in that direction.

11. The system of claim 1 wherein the recirculation chamber further includes one or more gas injection nozzles for injecting a gas other than air into space adjacent the glass batch recirculation screw section.

12. The system of claim 1 wherein the recirculation chamber further includes one or more gas injection nozzles for injecting a gas other than air into space adjacent the glass batch conveying screw section.

\* \* \* \* \*